J. W. BRENKERT.
LEMON JUICE EXTRACTOR.
APPLICATION FILED SEPT. 4, 1917.

1,344,857.

Patented June 29, 1920.

Inventor
Joseph W Brenkert
By A.B.Bowman
Attorney

UNITED STATES PATENT OFFICE.

JOSEPH W. BRENKERT, OF SAN DIEGO, CALIFORNIA.

LEMON-JUICE EXTRACTOR.

1,344,857. Specification of Letters Patent. Patented June 29, 1920.

Application filed September 4, 1917. Serial No. 189,464.

*To all whom it may concern:*

Be it known that I, JOSEPH W. BRENKERT, a citizen of the United States, residing at San Diego, in the county of San Diego and State of California, have invented certain new and useful Improvements in Lemon-Juice Extractors, of which the following is a specification.

My invention relates to lemon juice extractors, more particularly of the revolving type used by cutting the lemon in half and placing the one half over a revolving device and holding said half lemon for extracting the juice therefrom, and the objects of my invention are: First, to provide a device of this class without a corrugated surface thus eliminating the liability of chopping the seeds of the lemon and causing the juice to have a strong taste; second, to provide a device of this class in which the lemon seeds are permitted to pass through thus reducing to a minimum the liability of their being crushed or chopped up in the lemon juice; third, to provide a device of this class with means for catching the juice and preventing its being thrown away and wasted by centrifugal force of the extracting device; and fourth, to provide a device of this class which is simple and economical of construction, durable, easy to operate and will not readily deteriorate or get out of order.

Figure 1:
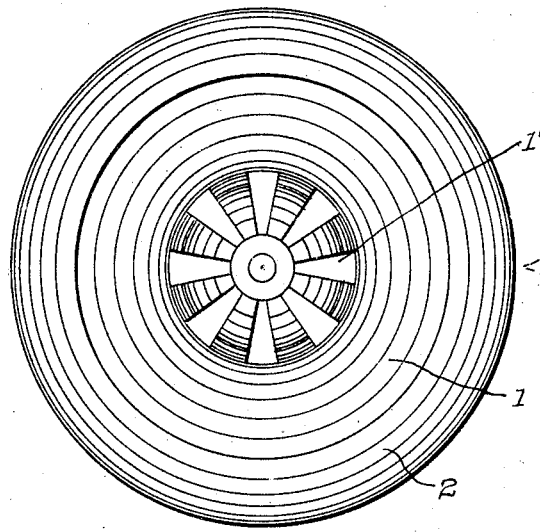
Figure 2:
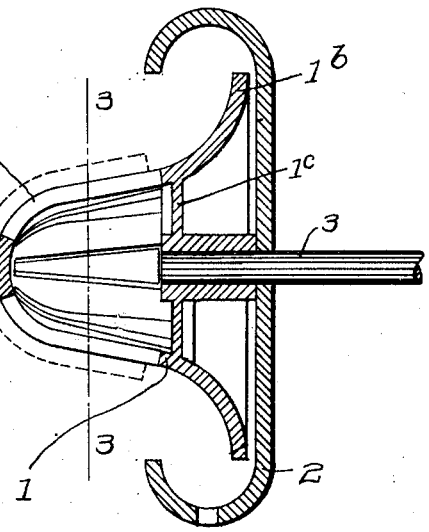
Figure 3:
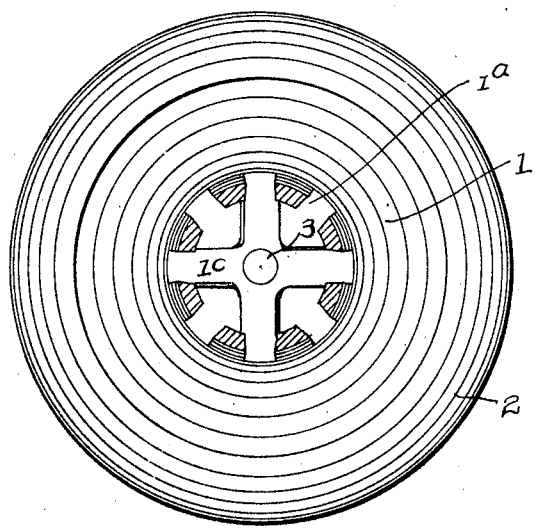
Figure 4:
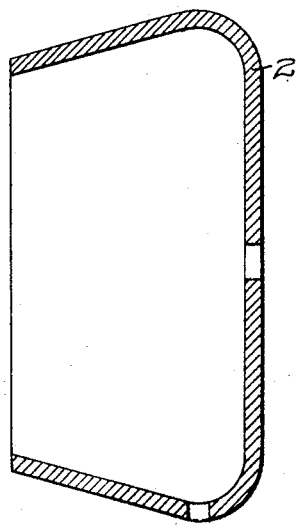

With these and other objects in view as will appear hereinafter, my invention consists of certain novel features of construction, combination and arrangement of parts and portions as will be hereinafter described in detail and particularly set forth in the appended claim, reference being had to the accompanying drawings and to the characters of reference thereon which form a part of this specification, in which:

Figure 1 is a front elevational view of my device; Fig. 2 is a sectional view thereof showing the shaft fragmentarily and showing a half lemon in position thereon by dotted lines; Fig. 3 is a sectional view through 3—3 of Fig. 2; and Fig. 4 is a sectional view of the juice catching cup shown in a slightly modified form from that of Figs. 1, 2 and 3.

Similar characters of reference refer to similar parts throughout the several views of the drawings.

The extracting device 1, cup 2, and shaft 3 constitute the principal parts of my extractor.

The extracting device 1 is a bell shaped hollow member adapted for a half lemon to fit over as shown best in Fig. 2 of the drawings and it is provided with a plurality of slots 1$^a$ which are narrow at the front end and broaden toward the rear. These slots also broaden inwardly from the outer surface so that seeds would readily pass through the same after starting and these slots are of sufficient width near the back end to permit a seed to readily pass through into the hollow portion of the bell shaped member. The back edge is provided with a curved flange 1$^b$ so that the juice will run down on the same and be caught in the cup with the revolution of the member 1. It is provided with a central spider 1$^c$, the arm members of which are on an angle forming a fan for providing suction for drawing the juice backwardly, in the center of which is secured the shaft 3 which may be revolved either by power or by hand as desired. Loosely mounted over the shaft and adjacent the flange 1$^b$ is a cup shaped member 2 which is adapted to catch the juice from the flange 1$^b$ in its revolution. The cup shown in Fig. 4 of the drawings is a slightly modified form of cup from that shown in Figs. 1, 2 and 3, the open edge extending up over the extracting device some distance but of sufficient size to permit the lemon to be readily placed in position on the extracting device.

Though I have shown and described a particular construction, combination and arrangement of parts and portions, I do not wish to be limited to this particular construction, combination and arrangement but desire to include in the purview of my invention the construction, combination and arrangement substantially as set forth in the appended claim.

It is obvious that with this construction there is provided a lemon juice extractor in which half lemons may be pressed on to the extractor 1 and held while said extractor revolves and the juice removed therefrom and the seeds, instead of being crushed, will pass through the slots 1$^a$ and be drawn backwardly by the spider 1$^c$ and pass out in the juice when the lemon peel is removed; that the slots in the extractor serve to facilitate the extraction of the juice from the lemon; that the juice will run down into the cup 2 out of which it will run into any receptacle placed there under for its reception.

Having thus described my invention, what I claim as new and desire to secure by Letters Patent, is:

In a lemon juice extractor, a revoluble bell shaped hollow member provided with a plurality of slots in the front end converging backwardly adapted to receive the lemon seeds and a spider with angle arms forming a fan whereby suction is provided for drawing the lemon juices backwardly.

In testimony whereof I have hereunto set my hand at San Diego, California, this 23d day of August, 1917.

JOSEPH W. BRENKERT.